United States Patent [19]

Hubred et al.

[11] 4,432,949
[45] Feb. 21, 1984

[54] RECOVERY OF COBALT, MOLYBDENUM, NICKEL AND VANADIUM FROM AN AQUEOUS AMMONIA AND AMMONIUM SALT SOLUTION BY PRECIPITATING VANADIUM AND SUBSEQUENT SERIAL ION EXCHANGE

[75] Inventors: Gale L. Hubred, Richmond; Dean A. Van Leirsburg, Petaluma, both of Calif.

[73] Assignee: Chevron Research Company, San Francisco, Calif.

[21] Appl. No.: 422,988

[22] Filed: Sep. 24, 1982

[51] Int. Cl.³ .................... C01G 39/00; C01G 41/00; C01G 51/00; C01G 31/00
[52] U.S. Cl. ........................................ 423/54; 423/63; 423/139; 75/101 BE
[58] Field of Search ................... 423/54, 63, 139; 75/101 BE

[56] References Cited

U.S. PATENT DOCUMENTS

| | | | |
|---|---|---|---|
| 3,773,890 | 11/1973 | Fox et al. | 423/63 |
| 4,012,483 | 3/1977 | Kane et al. | 423/139 |
| 4,145,397 | 3/1979 | Toida et al. | 423/63 |
| 4,258,016 | 3/1981 | Siemens et al. | 423/139 |

FOREIGN PATENT DOCUMENTS

| | | | |
|---|---|---|---|
| 53-109100 | 2/1978 | Japan | 423/54 |
| 53-115603 | 10/1978 | Japan | 423/63 |
| 1342400 | 1/1974 | United Kingdom | 423/139 |

Primary Examiner—Herbert T. Carter
Attorney, Agent, or Firm—D. A. Newell; S. R. La Paglia; V. J. Cavalieri

[57] ABSTRACT

A process for separating metal values from an aqueous stream containing vanadium, molybdenum, nickel and cobalt. Vanadium is first precipitated, and then nickel, cobalt, and molybdenum are removed by serial ion exchange.

2 Claims, 1 Drawing Figure

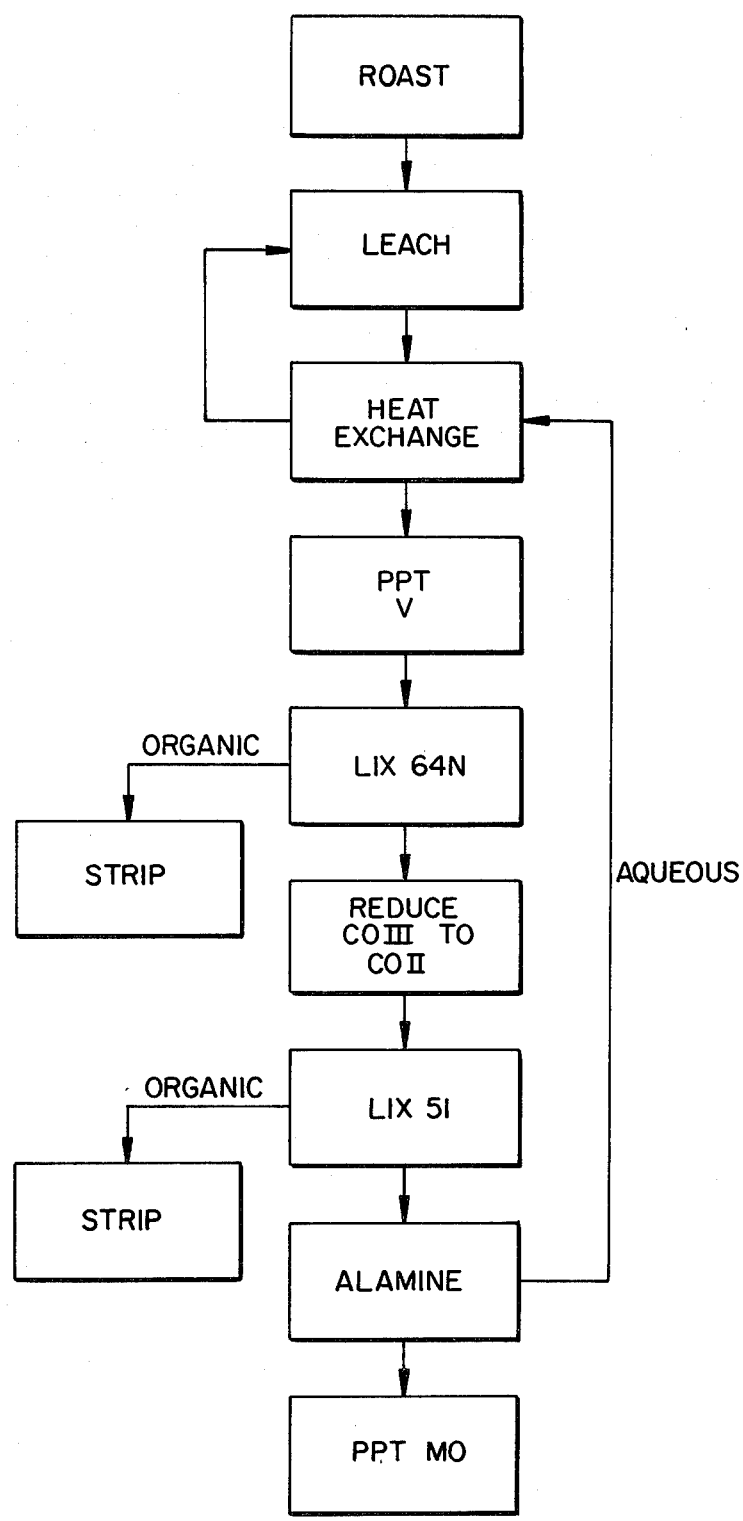

RECOVERY OF COBALT, MOLYBDENUM, NICKEL AND VANADIUM FROM AN AQUEOUS AMMONIA AND AMMONIUM SALT SOLUTION BY PRECIPITATING VANADIUM AND SUBSEQUENT SERIAL ION EXCHANGE

BACKGROUND OF THE INVENTION

This invention relates to methods of separating mixtures of metals from each other in aqueous solution. In particular, methods for separating mixtures at least one Group VIII metal from at least one metal from Group V and Group VI to form single metal salt solutions.

Many hydrocarbon feedstocks contain high percentages of metals, particularly iron, nickel and vanadium or tungsten. These metals tend to deposit on the surfaces of hydroprocessing catalysts which contain catalytic hydroprocessing metals, frequently cobalt or nickel and molybdenum or tungsten. When the hydroprocessing catalysts no longer give desired conversion rates, due in part to metals deposits plugging the catalyst's pores, they are replaced and disposed of. Because of growing shortages of petroleum in the world, refiners must use feedstocks that contain larger amounts of metals than those feedstocks heretofore used resulting in more spent catalysts. Recycling spent catalysts would also reduce problems attendant with disposal of spent catalysts.

Spent catalysts containing large quantities of both catalytic metals and metals removed from the hydrocarbon stream, can be viewed as high grade ores of nickel, cobalt, molybdenum and vanadium. Recycling cobalt, a particularly expensive metal, would lessen the cost of these catalysts.

Methods are known for leaching the metals from spent catalysts, for example, an ammonia and ammonium salt leach in aqueous liquid removes nickel, cobalt, molybdenum and vanadium but leaves behind both the catalyst support and iron. However, once in solution, cobalt, molybdenum, vanadium and nickel need to be separated from each other in relatively pure form.

SUMMARY OF THE INVENTION

This invention provides a process for separating metal values from a pregnant liquor containing metal values of at least one Group VIII metal, at least one Group VI metal and vanadium. The vanadium values are precipitated first, then the nickel and cobalt values are selectively transferred into organic solutions by serial ion exchange, and the organic solutions are then stripped. The values of the Group VI metal are transferred into organic solution by an organic extractant and the organic solution stripped.

DESCRIPTION OF THE DRAWING

FIG. 1 shows a flow scheme for the practice of this invention.

DETAILED DESCRIPTION OF THE PREFERRED EMBODIMENTS OF THE INVENTION

As petroleum refiners refine heavier crudes containing more metals, catalysts used in the hydroprocessing of crude oils and residual oils tend to accumulate large amounts of metals. At some point, during the use of the catalyst, the metals deposited on the catalysts, and other factors, reduce the activity so that the desired product specification can no longer be achieved. Such low activity, metals-containing catalysts are replaced with fresh catalysts and herein defined as "spent catalysts". Spent catalysts can contain from 3 to 30 weight percent catalytic metals, frequently a mixture of a Group VIII metal and a Group VI metal, as well as up to 50 weight percent metals removed from the feedstock, particularly iron, nickel and vanadium, which are supported on the catalyst support. Catalyst supports include refractory inorganic oxides, in particular, alumina, silica, titania, magnesia, and the like, either singly or in combination with each other.

Leaching

The Group VIII, Group V and Group VI metals may be leached from a catalytic support that has been freed of hydrocarbonaceous residua, known as "coke", and sulfur residues. The coke and sulfur residues are removed by roasting the catalyst particles in an oxygen gas containing atmosphere.

The roasted catalyst particles are leached in any conventional leach system that removes Group VIII, Group VI and Group V metals. A preferred method of leaching roasted spent catalyst is contacting the catalyst with an aqueous solution containing both $NH_3$ (aq), hereinafter ammonia, and $NH_4^+$ (aq), hereinafter ammonium. The concentration of ammonia should be about 2 M to 3 M and the concentration of ammonium should be roughly equal to the ammonia concentration. Preferred ammonium salts include ammonium sulfate and ammonium carbonate. At this concentration the pH of the solution should be about 8.5 to 11. A preferred temperature is about 80° C. to 90° C. In a typical spent catalyst, removed from desulfurization and demetalation service, the catalytic metals will be cobalt or nickel with either molybdenum or tungsten. Since nickel is frequently removed from the feedstock it is not unusual to find both nickel and cobalt together on spent catalyst, but it is never observed that spent catalyst contains both molybdenum and tungsten.

One problem noticed with the leach system is that cobalt recoveries suffer and recoveries of less than 50 percent are common. Since cobalt is frequently the most valuable metal maximum recovery of this metal is desired, so the leach is followed by atomic absorption, or other method that quickly determine cobalt concentration and the leach is stopped when cobalt recovery starts to fall. In typical cases this can be after as little time as 15 minutes.

It has also been observed that nickel recoveries from the ammoniacal system suffer if the roasting temperature is too high. Preferred roasting temperatures are less than about 600° C.

Extraction

The metals in the solution from an ammoniacal leach, or any other process giving rise to an aqueous solution containing at least one Group VIII metal and at least one metal selected from the group consisting of Group V and Group VI metals can then be separated by the process of this invention. In the case of the ammoniacal leach of spent catalyst particles a variety of contaminants tend to go into solution, including aluminates, silicates, phosphates, sulfates and the like. By the process of the present invention the metals are removed from the impurities and separated into a plurality of aqueous metals-containing solutions that can be processed further to produce pure metal salts or pure metals. The aqueous solution containing at least one metal from Group VIII and at least one metal from the group consisting of Group V and Group VI will be hereinafter termed the "pregnant liquor", a term intended to define any metals-containing aqueous solution of any origin.

The pregnant liquor from the ammoniacal leach is extracted sequentially with several liquid ion exchange reagents. The metal ions of interest can be divided into two categories. In the first category are metals from Group VIII, in particular cobalt and nickel, which are present in the pregnant liquor as cations. In the second category are metals selected from Group V and Group VI, in particular molybdenum, tungsten and vanadium, which are present in the pregnant liquor as oxyanions.

Vanadium

Typically, leaching is done at elevated temperature, between 80° C. and 90° C. If the leach system consists of an aqueous solution of ammonia and ammonium, the principal form of vanadium compound formed is ammonium metavanadate, a salt that is not particularly highly soluble in an aqueous solution. If the temperature is dropped to about 30° C. to 0° C., the vanadium present precipitates nearly quantitatively leaving a cooled pregnant liquor containing cobalt, nickel and either molybdenum or tungsten. The precipitation of vanadium can be done by any other method desired.

Nickel and Cobalt

The Group VIII metals, still in the pregnant liquor solution, are each selectively placed into at least one organic solution, which contains at most one Group VIII metal, by serial liquid ion exchange. The organic solution so formed are then stripped forming at least one Group VIII metal containing aqueous solution. The most prevalent Group VIII metals in the leach liquor of spent hydrodemetalation catalyst are nickel and cobalt.

Nickel is extracted with an organic nickel extractant. Preferred organic extractants include hydroxyoximes. The hydroxyoxime component has the general formula

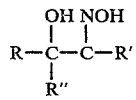

where R, R' and R" may be a variety of organic hydrocarbon radicals such as aliphatic and alkyaryl radicals. R" may also be hydrogen. Preferably, R and R' are unsaturated hydrocarbons or branched-chain alkyl groups containing from about 6 to about 20 carbon atoms. R and R' are also preferably the same and an alkyl is preferably attached to the carbons substituted with the OH and NOH groups through a secondary carbon atom. It is also preferred that R" is hydrogen or unsaturated hydrocarbons or branched-chain alkyl groups containing from 6 to 20 carbon atoms.

Suitable oximes are disclosed, for example, in U.S. Pat. Nos. 3,224,873, 3592,775, 3,455,680, 3,428,499, 3,276,863 and 3,197,274. Particularly suitable extractants comprise 2-hydroxy-4-nonylbenzophenoxime which is a primary extractant in a composition also containing an alpha-hydroxyoxime sold by Henkel Corporation under the trade name of LIX 64N ®; 8-diethyl-7-hydroxy-6-dodecanoneoxime, which is the primary extractant in a composition sold by Henkel Corporation under the trade name of LIX 63 ®; and 2-hydroxy-4-dodecylbenzophenoxime, which is the primary extractant in a composition also containing an alpha-hydroxyoxime sold by Henkel Corporation under the trade name of LIX 64 ®.

The preferred extracting agent is LIX 64N ®. This agent contains about 46 to 50 percent beta-hydroxybenzophenoneoxime and about 1 to 2 percent of a aliphatic alpha-hydroxyoxime in a hydrocarbon dilutant such as kerosene. This extracting agent provides nearly quantitative extraction of nickel and provides a very high degree of separation for nickel (II) over cobalt (III).

Nickel is stripped from the extractant by any aqueous stripping solution known to work, preferably sulfuric acid. Cobalt is extracted next in the sequential extractions. The cobalt in the pregnant liquor is in the +3 oxidation state and must be reduced to the +2 oxidation state before it can be easily extracted by conventional cobalt extracting agents. Cobalt (III) is conventionally reduced to cobalt (II) by contacting the cobalt (III) solution with cobalt metal. One form of cobalt metal for this reduction is cobalt shot.

The cobalt (II) is then extracted with an extracting agent containing a metal chelating beta-diketone extractant. A preferred extractant is a beta-diketone of the formula

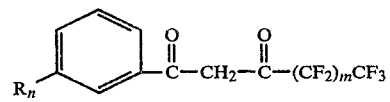

where n is 1 to 4, m is 0, 1 or 2, and R is an alkyl group of 1 to 25 carbon atoms. The compounds and their preparation are disclosed in U.S. Pat. No. 4,152,396, the disclosure of which is also incorporated herein by reference, and is sold by Henkel Corporation under the trade name of LIX 51 ®. Other organic cobalt (II) extractants include the oximes, dioximes and diketones aforementioned as nickel extractants. If the same extractant is used both for cobalt and nickel, selectivity can be provided by the oxidation state of cobalt.

Suitably, the metal chelating beta-diketone extractant is dissolved in kerosene; 10 to 15 percent alcohol is kerosene. Advantageously, the alcohol contains about 10 carbon atoms with decanol being preferred. A preferred hydrocarbon is kerosene. The illustrative of a preferred hydrocarbon is Kermac 470B ®, which is marketed by Kerr-McGee. The ratio of metal chelating beta-diketone to alcohol to hydrocarbon to be used is governed by considerations such as speed and completeness of phase separations and concentration of cobalt in the liquor to be extracted. When decanol and Kermac 470B are selected for use as the alcohol and the hydrocarbon, respectively, the optimum decanol concentration is about 15 volume percent with a concentration range of about 10 to 20 volume percent being operative.

The maximum loading capacity of cobalt (II) on the 5 volume percent beta-diketone extractant solution is about 2.6 grams per liter. At this level, no precipitation occurs in the organic phase. An organic solution containing about 5 volume percent of beta-diketone extractant, is typically sufficient to remove all the cobalt encountered from an ammoniacal leach of spent catalysts. Thus, a preferred embodiment of extracting an agent for use on raffinates produced from spent catalysts contains about 5 volume percent beta-ketone, about 15 volume percent decanol and about 75 to 85 volume percent Kermac 470B. Suitably the extraction step is carried out at a temperature in the range from about room temperature to about 40° C. and is carried out in one stage or two stages of countercurrent extraction. The loading of cobalt (II) on a beta-diketone extraction is strongly pH dependent. Cobalt (II) begins to load in weakly acidic solutions with the maximum loading taking place between pH 7.5 and 9.5. Thus, pH adjustment by evaporation of ammonia from the leach liquor prior to extraction of nickel values aids cobalt to extraction. If necessary, the pH may be further adjusted at this time by addition of sulfuric acid or ammonium hydroxide depending on whether the pH needs to be adjusted upward or downward. It has been found that extractions are favorable in solutions with less than 50 grams per liter of ammonia concentration.

The organic phase containing cobalt may be stripped by several of any alternative methods. One conventional stripping technique frequently used, is stripping the cobalt values with sulfuric acid producing cobalt sulfate in an aqueous phase. A stripping method found to work is the use of an ammonia and ammonium salt solution to strip cobalt from the organic phase.

An alternative method is adding other metallic ions, for example, copper (II) or nickel (II), to "crowd" the cobalt from the organic extractant freeing the cobalt into an aqueous solution.

The aqueous solutions of Group VIII metals produced by this invention can be processed further to produce pure metal or a salt that can be directly reused to form new catalyst. Nickel or cobalt can be electrowon or directly reduced by hydrogen gas. The aqueous solutions of nickel or cobalt can be used directly as a metal source for impregnating or comulling new catalyst.

Group VI Metals

The Group VI metal remaining in solution is then extracted with an organic extractant. Tertiary amines of the form $NR_3$, where R is a group containing at least 6 carbons, are particularly good extractants for this invention. One example is Alamine® sold by Henkel Corporation. The organic solution used is preferably about 10 percent Alamine, 10 percent decanol and 80 percent kerosene. The organic solution can now be stripped by a concentrated ammonium hydroxide solution which yields a concentrated molybdenum solution. Ammonium molybdate can easily be precipitated by reducing the volume of the solution.

DETAILED DESCRIPTION OF THE DRAWING

FIG. 1 shows an embodiment of this invention. Spent catalyst known to contain nickel, cobalt, vanadium and molybdenum is roasted at between 400° C. and 600° C. The roasted catalyst is leached with an ammoniacal solution at about 90° C. The pregnant liquor is cooled to about 30° C. by heat exchange, and the vanadium values are allowed to precipitate. The solution is then contacted with an organic solution of LIX 64®. The organic phase removes nickel which is stripped by sulfuric acid. The resulting aqueous phase is contacted with cobalt metal to reduce cobalt (III) to cobalt (II). Cobalt (II) is extracted with LIX 51® and the organic is stripped with an aqueous ammoniacal solution. The resulting aqueous solution is contacted with an organic solution of Alamine® and the resulting metal-free aqueous solution is recycled and heated by exchange with the hot pregnant liquor. The organic solution is stripped and molybdenum precipitated.

What is claimed is:

1. A process for separating metal values from an ammoniacal ammonium aqueous solution containing:
    (i) vanadium;
    (ii) at least one metal value selected from the group consisting of cobalt and nickel;
    (iii) at least one metal value selected from the group consisting of molybdenum and tungsten; comprising the steps of:
    (a) precipitating vanadium values by cooling the solution to about 0°-30° C.
    (b) transferring nickel values from said solution into a first organic extractant comprising a hydroxyoxime;
    (c) reducing cobalt values in said solution to the divalent state;
    (d) transferring said divalent cobalt into a second organic extractant selected from the group consisting of oximes, dioximes and diketones;
    (e) transferring molybdenum and tungsten metal values from said solution into a third organic extractant comprising a tetiary amine, and
    (f) stripping each of said organic solutions with an aqueous stripping solution to form a metal-containing aqueous solution.

2. The process of claim 1 wherein said metal values of molybdenum and tungsten include oxyanions.

* * * * *